United States Patent
Qian et al.

(10) Patent No.: US 7,359,496 B2
(45) Date of Patent: Apr. 15, 2008

(54) COMMUNICATIONS SYSTEM AND METHOD FOR PROVIDING CUSTOMIZED MESSAGES BASED ON PRESENCE AND PREFERENCE INFORMATION

(75) Inventors: Jing Qian, Plano, TX (US); Aziz Mohammed, Plano, TX (US); Fuming Wu, Frisco, TX (US)

(73) Assignee: Alcatel Lucent, Paris (FR)

( * ) Notice: Subject to any disclaimer, the term of this patent is extended or adjusted under 35 U.S.C. 154(b) by 510 days.

(21) Appl. No.: 11/016,254

(22) Filed: Dec. 17, 2004

(65) Prior Publication Data

US 2006/0146997 A1    Jul. 6, 2006

(51) Int. Cl.
*H04M 3/42* (2006.01)
(52) U.S. Cl. .............................. 379/201.07; 379/211.01
(58) Field of Classification Search ........... 379/211.01, 379/215.01, 88.13, 88.14, 88.15, 88.12, 88.22, 379/201.02, 201.07; 709/204; 370/260, 370/261

See application file for complete search history.

(56) References Cited

U.S. PATENT DOCUMENTS 6,807,423 B1 * 10/2004 Armstrong et al. ......... 455/440

7,035,923 B1 * 4/2006 Yoakum et al. ............. 709/224
2003/0161452 A1    8/2003 Fournier et al.

FOREIGN PATENT DOCUMENTS

EP         1 267 557 A1    12/2002
WO    WO 03/019908 A2     3/2003

* cited by examiner

*Primary Examiner*—Olisa Anwah
(74) *Attorney, Agent, or Firm*—Garlick Harrision & Markison; Bobby D. Slaton

(57) ABSTRACT

A communications system provides customized messages based on presence and preference information by collecting presence information and preference information on a plurality of subscribers. The presence information includes information on the availability of a subscriber, while the preference information includes policies for different priority levels of callers. In response to unavailability of a called subscriber for a communication session, the communications manager transmits a customized response to the caller that is generated based on the presence information and the preference information of the called subscriber.

19 Claims, 2 Drawing Sheets

COMMUNICATIONS SYSTEM AND METHOD FOR PROVIDING CUSTOMIZED MESSAGES BASED ON PRESENCE AND PREFERENCE INFORMATION

BACKGROUND OF THE INVENTION

1. Technical Field of the Invention

The present invention relates in general to a presence-based interactive communications system, and in particular, to handling of missed contact attempts based on preference and presence information.

2. Description of Related Art

Presence-based interactive communication services are callee-centric, where callees (presentities) publish, in real time, their presence information (such as, the availability, activity, local time, location, current status of the active devices/applications and the corresponding preferences, etc.) to callers (presence watchers) who have subscribed to the presence information. The presence information is designed to enable the callers to more efficiently and effectively contact the callees.

Currently, when a caller requests a communication session (e.g., voice, text or multimedia) with a callee, but due to the unavailability of the callee, the communication session is unable to be established, a message is generated and transmitted to the caller based only on the callee's (presentity's) presence information, but not on the callee's or caller's media preference. For example, the caller may prefer to receive the response message using either a real-time text, voice and/or multimedia media type (e.g., instant messenger or a customized voice greeting) or a non-real-time text, voice and/or multimedia media type (e.g., e-mail or sending message directly to the caller's voice mailbox). However, existing presence systems do not accommodate for the media preference of both the caller and the callee.

In addition, existing preference and presence systems provide only limited callee presence information to the caller in a response message. For example, when a caller attempts to communicate with a callee by text, voice or multimedia, and the callee is unavailable for the communication session, the caller may want to obtain the following information: (1) the callee's current activity is; (2) when the callee will be available; (3) emergency contact number for the callee; and (4) alternative contact names/numbers.

Based on existing presence technology, the caller may receive a presence-based voice greeting that includes the callee's current activity, but not any of the additional information listed above.

Furthermore, the callee is not able to control the content of missed call response messages according to different authorities or priorities granted to the caller by the callee, which may reduce the callee's communication and privacy satisfaction. For example, depending upon the importance of the caller to the callee or the category of the caller, the callee may want to provide more or less presence information to the caller. However, current presence systems do not allow a callee to provide different presence information to different callers.

As a result, what is needed is a communications system and method for generating and providing customized messages to callers based on presence information and preference information of both the callee and the caller.

SUMMARY OF THE INVENTION

Embodiments of the present invention provide a communications system for providing customized messages based on presence and preference information. The communications system includes a presence server for collecting presence information and preference information on a plurality of subscribers. The presence information includes information on the availability of a subscriber, while the preference information includes policies for different priority levels of callers. The communications system further includes a communications manager for receiving a request for a communication session with one of the subscribers from a caller. In response to unavailability of the called subscriber for the communication session, the communications manager transmits a customized response to the caller that is generated based on the presence information and the preference information of the called subscriber.

In one embodiment, the customized message includes at least a portion of the presence information of the called subscriber based on a priority level granted to the caller in the preference information of the called subscriber. In another embodiment, the customized message is a default message based on the priority level granted to the caller.

In a further embodiment, the communications manager further extracts presence information and preference information of the caller from the presence server when the caller is one of the subscribers. For example, the presence information can include a media status of the caller and the preference information can include a media preference of the caller to enable the communications manager to transmit the customized message to the caller based on the media status and the media preference of the caller.

Advantageously, embodiments of the present invention increase communication efficiency by providing additional information on when and/or how to reach the callee, and in some cases whom to contact alternatively. In addition, embodiments of the present invention provide improved caller satisfaction during communication, and improved callee control on his/her privacy information by customizing the privileges granted to different callers.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
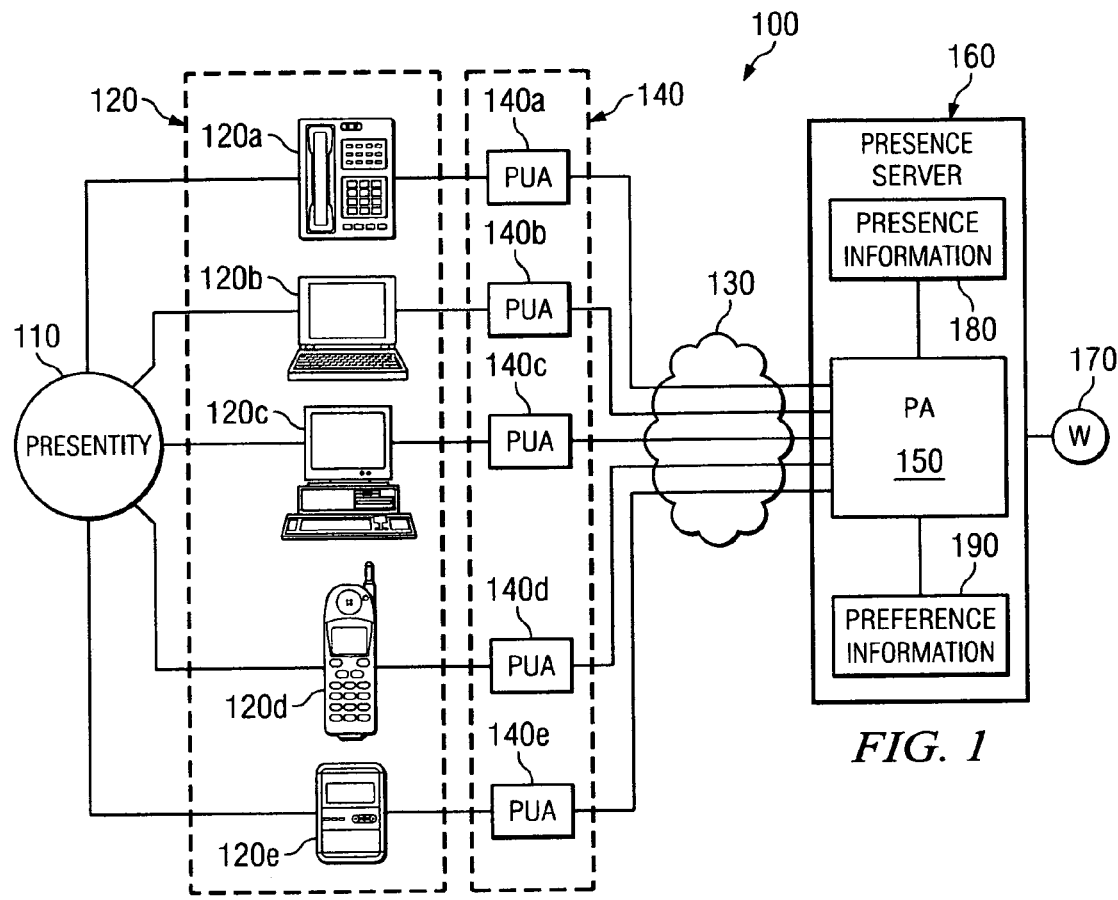
FIG. 1 illustrates an exemplary presence system in accordance with embodiments of the present invention.

Referring to FIG. 1, there is illustrated an exemplary presence system 100 capable of implementing various embodiments of the present invention. The presence system 100 includes a presentity 110 and one or more devices 120 associated with the presentity 110. The presentity 110 represents the callee and provides presence information 180 on the callee's presence status to the presence system 100. Each device 120 is a physical communications device capable of sending and/or receiving communications over a communications network 130. Examples of such devices 120 include, but are not limited to, a desktop phone 120a, a laptop computer 120b, a personal computer 120c, a cell phone 120d and a personal digital assistant (PDA) 120e. In FIG. 1, the communications network 130 represents any type of network over which media (circuit-switched or packet-switched voice or data) may be sent. For example, the communications network 130 can include the Public Switched Telephone Network (PSTN), Public Land Mobile Network (PLMN), one or more private local area networks (LANs), the Internet and/or any other type or combination of networks.

The presence system 100 further includes one or more presence user agents 140 (PUAs), a presence agent (PA) 150, a presence server 160 and one or more watchers 170 of the presentity 110. The PUAs 140 are capable of manipulating and providing preference information 190 and presence information 180 for the presentity 110. In FIG. 1, a separate PUA 140 is shown for each device 120. However, it should be understood that in other embodiments, the number of PUAs 140 can vary based on the number and type of devices 120, the applications supported by the devices 120 and the system configuration. Each PUA 140 independently generates a component of the overall presence information 180 for a presentity 110. Typically, PUA's 140 generate presence information 180 when a change in presence status occurs. Examples of changes in presence status include, but are not limited to, turning on and off a device 120, modifying the registration from a device 120 and changing the instant messaging status on a device 120. Preference information 190 is entered into the presence system 100 by the presentity 110 and/or may be at least partially configured by the operator of the presence system 100.

The presence information 180 and preference information 190 from each of the PUAs 140 is collected by one or more presence agents (PAs) 150. In FIG. 1, only one PA 150 is shown for simplicity. However, it should be understood that in other embodiments, there can be multiple PAs 150 for a presentity 110, each of which is responsible for a subset of the total subscriptions (requests for presence information from watchers 170) currently active for the presentity 110. The PA 150 maintains the current complete presence information 180 for the presentity 110 and provides the presence information to one or more watchers 170 (callers) of the presentity 110.

The presence server 160 is a physical entity that can operate as either the PA 150 or as a proxy server for routing requests from watchers 170 to the PA 150. Thus, the PA 150 in combination with the presence server 160, is operable to receive preference and presence information 190 and 180, respectively, of the presentity 110 from the PUAs 140, receive preference and presence information from the watcher 170, receive requests from the watcher 170 for presence and preference information 180 and 190, respectively, of the presentity 110 and provide the presence and preference information 180 and 190, respectively, of the presentity 110 to the watcher 170. When acting as a PA 150, the presence server 160 can also be co-located with a PUA 140.

In FIG. 1, the presence server 160 is shown operating as a PA 150 by collecting and storing presence information 180 and preference information 190 for a plurality of subscribers (e.g., presentities 110 and watchers 170). Examples of presence information 180 include, but are not limited to, the subscriber's current activity (e.g., meeting, voice call, multimedia communication session, etc.), information on when the subscriber will be available, emergency contact numbers for the subscriber and alternative contact names/numbers. Examples of preference information 190 include, but are not limited to, policies for different priority levels of callers and the subscriber's media preferences.

The presence system 100 uses a presence protocol to provide presence services to presentities 110 and watchers 170. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union—Telecommunications ("ITU-T") H.263 standard (video CODEC), the G.711 and G.729 standards (audio CODECS), and other or additional standards or protocols. As will be appreciated, other or additional protocols and configurations may be used.

SIP networks are capable of routing requests from any user on the network to the server that maintains the registration state for a user. Thus, SIP networks enable a caller (watcher) to transmit a SUBSCRIBE request for presence and preference information relating to a particular callee (presentity 110) to be routed to the presence server 160 that maintains the presence and preference information for the presentity 110. In operation, the presence server 160 and PA 150 may be co-located with the SIP proxy/registrar for efficiency purposes.

Figure 2:
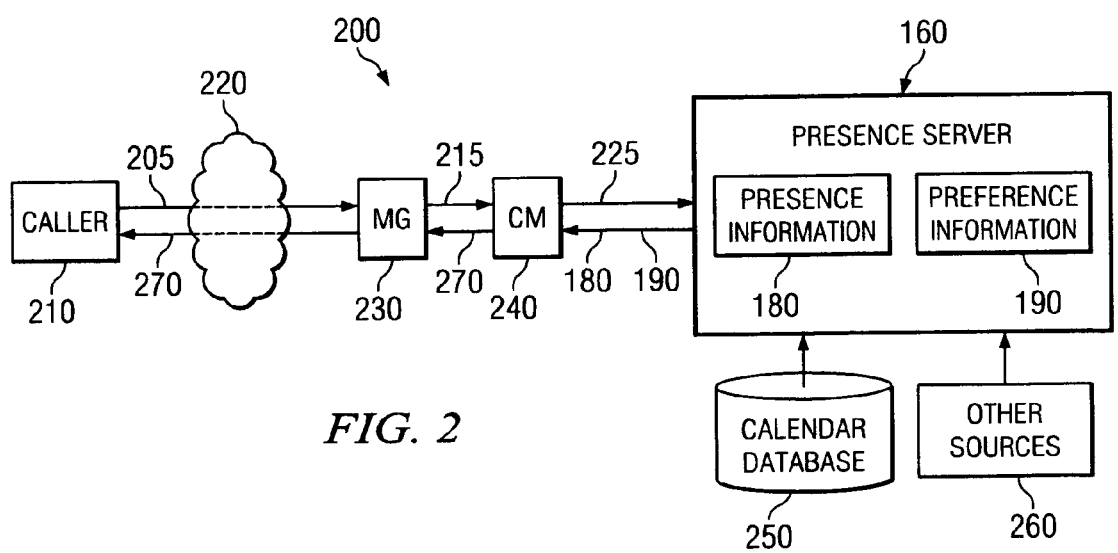
FIG. 2 illustrates an exemplary communications system incorporating a presence system to generate and transmit customized call response messages based on the presence information and preference information of the called subscriber, in accordance with embodiments of the present invention.

Referring now to FIG. 2, there is illustrated an exemplary communications system 200 incorporating a presence system to generate and transmit customized call response messages based on the presence information and preference information of the called subscriber, in accordance with embodiments of the present invention. In FIG. 2, a caller 210 sends a request 205 for a communication session (e.g., real-time or non-real-time voice, text or multimedia) with a callee (called subscriber, not specifically shown) to a media gateway (MG) 230 through a communications network 200 (e.g., PSTN, PLMN, LAN, Internet, etc.). The MG 230 includes any device, such as a circuit switch, IP gateway or other device that converts data from the format required by one type of network to the format required by another type of network. It should be understood that if the caller 210 and the called subscriber are both connected to the same network, the MG 230 may not be necessary.

The MG 230 forwards the request 205 to a Communications Manager (CM) 240 for the called subscriber. The CM 240 manages communication sessions for the called subscriber and other subscribers registered with the presence server 160. The CM 240 is typically located on the called subscriber's premises with the presence server 160. However, in other embodiments, the CM 240 may distributed or remote from the presence server 160. The CM 240 may be co-located with the MG 230 or the presence server 160 or may be implemented on a separate device.

The CM 240 determines if the called subscriber is available for the requested communication session, and if not, sends a request 225 to the presence server 160 for the called subscriber's presence information 180 and preference information 190. The presence server 160 integrates presence information 180 for the called subscriber from internal presence information provided by PUA's (as shown in FIG. 1), a calendar database 250 associated with the called subscriber and other sources 260 of presence information, and sends the integrated presence information 180 back to the CM 240. In an additional embodiment, if the caller 210 is a subscriber to the presence server, the CM 240 also retrieves the presence information 180 and preference information 190 for the caller 210 from the presence server 160. The CM 240 processes the returned presence information 180 and preference information 190 from the presence server 160, generates a customized message 270 based on the called subscriber's presence information 180 and preference information 190 and transmits the customized message 270 to the MG 230 for forwarding back to the caller 210.

The preference information 190 of the called subscriber determines the type and amount of the called subscriber's presence information 180 that is disclosed to the caller 210 in the customized message 270. In one embodiment, the preference information 180 includes policies for different priority levels granted to callers. Thus, the CM 240 compares the identity of the caller 210 to the preference information 180 to determine if the called subscriber has set a specific priority level for the caller 210.

For example, an employee called subscriber may set a priority level for his/her boss to a high priority level to provide as much presence information 180 as possible in the customized message 270. Examples of presence information 180 for the employee called subscriber include, but are not limited to, current activity of employee (e.g., meeting, vacation, traveling, etc.), current location of employee (e.g., meeting room number or outside location), a time when the employee will next be available, and an emergency contact number or emergency contact method for the employee.

As another example, the employee called subscriber may set a priority level for an important customer to a different priority level than that of the employee's boss to provide different presence information 180 to the customer. For example, if the customer calls or sends an e-mail to the employee called subscriber to inquiry about product information, and the employee called subscriber is not available, the priority level of the customer may indicate to the CM 240 that the customized message 270 should be an e-mail that includes a time when the employee will be available, an emergency contact number and an alternative contact name and number. In addition, the priority level granted to the customer by the employee called subscriber may also indicate to the CM 240 that the CM 240 should automatically forward the e-mail or call to the employee's manager.

As a further example, the employee called subscriber may set a priority level for an unknown caller to a low priority level to provide minimal employee presence information 180 to the unknown caller. For example, the low priority level may indicate to the CM 240 to provide either no presence information to the unknown caller (e.g., no response for email), a default voice greeting or other default message (e.g., "I am on vacation and will be back on a certain date.") in the customized message 270.

As described above, if the caller 210 is a subscriber of the presence server 160, the CM 240 may also retrieve the presence information 180 and preference information 190 for the caller 210. For example, the presence information 180 can include the media status of the caller 210, and the preference information 190 can include the media preferences of the caller 210. The media status indicates the availability of the caller 210 per media type. An exemplary method for determining the media status of a subscriber is described in co-pending and commonly assigned U.S. application for patent Ser. No. 11/013,265 filed on even date herewith, and which is hereby incorporated by reference. The media preference indicates the media type that the caller 210 prefers for receiving customized call response messages 270. An exemplary method for determining the media preferences of a subscriber is described in co-pending and commonly assigned U.S. application for patent Ser. No. 11/012,670 filed on even date herewith, and which is hereby incorporated by reference.

Based on the caller's media status and media preferences, the CM 240 determines the media channel(s) for delivering the customized message 270 to the caller 210. For example, the CM 240 may deliver the customized message 270 to the caller 210 using the preferred available real-time media for the caller 210. However, if the caller 210 is not a subscriber of the presence server 160, or the presence server 160 does not return any presence information 180 or preference information 190 for the caller 210, the CM 240 can use the caller's current communication channel to transmit the customized message 270.

Using the employee called subscriber example described above, if the employee's boss is in a meeting and wants to know a testing result from the unavailable employee, the presence and preference information of the boss may indicate to the CM 240 to send the customized message 270 to the boss's cell phone mailbox to avoid interfering with the meeting.

It should be noted that the CM 240 may be constructed or configured using hardware, software, firmware, or combination thereof for managing communication sessions (e.g., real-time and non-real-time voice, text and multimedia communication sessions). As an example, the CM 240 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein. In one embodiment, the CM 240 can include one or more processes, such as software applications providing an activity, a function, or a systematic sequence of tasks that produces a specified result, for managing communications sessions.

Figure 3:
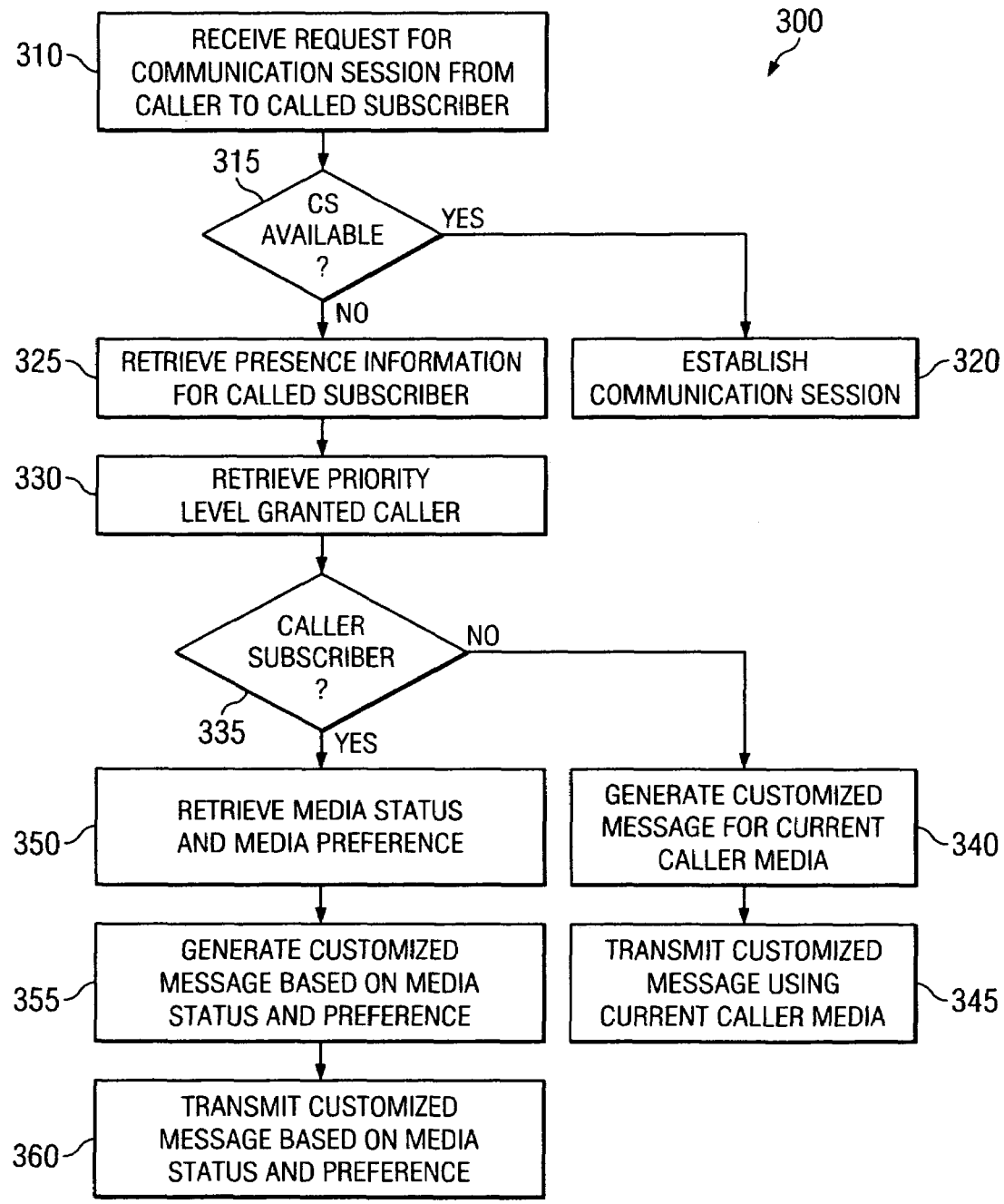
FIG. 3 is a flowchart illustrating an exemplary process for generating and transmitting a customized call response message, in accordance with embodiments of the present invention.

FIG. 3 is a flowchart illustrating an exemplary process 300 for generating and transmitting a customized call response message, in accordance with embodiments of the present invention. Initially, at block 310, a request for a communication session (e.g., text, voice, multimedia or any combination thereof) from a caller to a called subscriber is received at the Communication Manager (CM) of the called subscriber's network. The CM checks the status of the called subscriber at block 315, and if the called subscriber is available, the CM establishes a connection with the called subscriber for the communication session at block 320.

However, if the called subscriber is unavailable, at block 325, the CM retrieves the presence information for the called subscriber from the presence server. In addition, at block 330, the CM retrieves the priority level (preference information) granted to the caller by the called subscriber. At block 335, if the caller is not a subscriber of the called subscriber's presence server, no presence or preference information for the caller is retrieved by the CM from the presence server. Therefore, at block 340, the CM generates the customized message based only on the called subscriber's presence and preference information and transmits the customized message to the caller using the caller's current communication media at block 345. The customized message includes the presence information of the called subscriber that is associated with the priority level granted to the caller.

However, if the caller is a subscriber of the called subscriber's presence server, at block 350, the CM retrieves from the presence server the caller's presence and preference information. For example, the caller's presence information can include the media status of the caller, and the caller's preference information can include the media preference(s) of the caller. At block 355, the CM generates the customized message based on both the caller's and the called subscriber's presence and preference information, and transmits the customized message to the caller based on the caller's media status and media preference at block 360.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A communications system for providing customized messages based on presence and preference information, comprising:
   a presence server capable of collecting presence information and preference information on a plurality of subscribers, wherein said presence information includes availability of a subscriber and said preference information includes policies for different priority levels of callers; and
   a communications manager connected to receive a request for a communication session with a select one of said plurality of subscribers from a caller, wherein said communications manager is operable to extract said presence information and said preference information of said select subscriber and said caller from said presence server, and in response to unavailability of said select subscriber for said communication session, transmit a customized response to said caller, wherein said customized response is generated based on said presence information and said preference information of said select subscriber and is transmitted to said caller based on said presence information and said preference information of said caller.

2. The communications system of claim 1, wherein said customized message includes at least a portion of said presence information of said select subscriber based on a priority level granted to said caller in said preference information of said select subscriber.

3. The communications system of claim 2, wherein said customized message includes an alternate contact number based on said priority level granted to said caller.

4. The communications system of claim 2, wherein said customized message includes an emergency contact number for said select subscriber based on said priority level granted to said caller.

5. The communications system of claim 2, wherein customized message is a default message based on said priority level granted to said caller.

6. The communications system of claim 2, wherein said communications manager is further operable to perform additional handling of said communication session based on said priority level granted to said caller.

7. The communications system of claim 1, wherein said presence information including a media status of said caller and said preference information including a media preference of said caller, and wherein said communications manager is further operable to transmit said customized message to said caller based on said media status and said media preference.

8. The communications system of claim 1, wherein said presence server is further capable of integrating said presence information from one or more sources of presence data.

9. The communications system of claim 8, wherein said communications manager is further operable to transmit said customized message to said caller using a current communication media of said caller.

10. A method for providing customized messages based on presence and preference information, comprising the steps of:
    receiving a request for a communication session with a subscriber from a caller;
    retrieving presence information and preference information of said select subscriber and said caller, wherein said presence information includes availability of said subscriber and said preference information includes policies for different priority levels of callers; and
    transmitting a customized response to said caller in response to unavailability of said select subscriber for said communication session, wherein said customized response is generated based on said presence information and said preference information of said select subscriber and is transmitted to said caller based on said presence information and said preference information of said caller.

11. The method of claim 10, wherein said transmitting further comprises the step of:
    generating said customized message including at least a portion of said presence information of said subscriber based on a priority level granted to said caller in said preference information of said subscriber.

12. The method of claim 11, wherein said generating further comprises the step of:
    generating said customized message including an alternate contact number based on said priority level granted to said caller.

13. The method of claim 11, wherein said generating further comprises the step of:
    generating said customized message including an emergency contact number for said subscriber based on said priority level granted to said caller.

14. The method of claim 11, wherein said generating further comprises the step of:
    generating said customized message as a default message based on said priority level granted to said caller.

15. The method of claim 11, further comprising the step of:
    performing additional handling of said communication session based on said priority level granted to said caller.

16. The method of claim 10, further comprising the step of:

retrieving presence information and preference information of said caller, said presence information including a media status of said caller and said preference information including a media preference of said caller.

17. The method of claim 16, wherein said transmitting further comprises the step of:

transmitting said customized message to said caller based on said media status and said media preference.

18. The method of claim 1, further comprising the step of:

collecting said presence information from one or more sources of presence data.

19. The method of claim 1, wherein said step of transmitting further comprises the step of:

transmitting said customized message to said caller using a current communication media of said caller.

* * * * *